(12) United States Patent
Blanchard et al.

(10) Patent No.: US 8,408,009 B2
(45) Date of Patent: Apr. 2, 2013

(54) COOLING AIR BLEED DEVICE IN A TURBINE ENGINE

(75) Inventors: Stephane Pierre Guillaume Blanchard, Chartrettes (FR); Mathieu Dakowski, Sucy en Brie (FR); Thomas Daris, Paris (FR); Romain Nicolas Lunel, Montereau sur le Jard (FR)

(73) Assignee: Snecma, Paris (FR)

( * ) Notice: Subject to any disclaimer, the term of this patent is extended or adjusted under 35 U.S.C. 154(b) by 953 days.

(21) Appl. No.: 12/489,844

(22) Filed: Jun. 23, 2009

(65) Prior Publication Data

US 2009/0320497 A1 Dec. 31, 2009

(30) Foreign Application Priority Data

Jun. 25, 2008 (FR) ..................... 08 03550

(51) Int. Cl.
*F02C 6/04* (2006.01)
(52) U.S. Cl. ........... 60/785; 60/770; 60/231; 60/262; 60/266; 137/855; 251/148; 251/158; 239/127.1; 239/265.17; 239/265.39
(58) Field of Classification Search .......... 60/770, 60/231, 266, 782, 785, 262; 251/158, 298, 251/299, 300, 301, 302, 303, 187, 203, 204, 251/228, 251, 257, 148; 239/127.1, 265.39, 239/265.17; 137/855
See application file for complete search history.

(56) References Cited

U.S. PATENT DOCUMENTS

| | | | | |
|---|---|---|---|---|
| 3,244,194 A | * | 4/1966 | Henry | 137/460 |
| 3,539,150 A | * | 11/1970 | Conrad | 251/228 |
| 3,672,630 A | * | 6/1972 | Naumburg et al. | 251/149.2 |
| 3,875,921 A | * | 4/1975 | Deboy et al. | 123/188.16 |
| 3,979,065 A | * | 9/1976 | Madden | 239/127.3 |
| 4,000,612 A | * | 1/1977 | Wakeman et al. | 60/230 |
| 4,203,286 A | * | 5/1980 | Warburton | 60/266 |
| 5,255,849 A | * | 10/1993 | Mayer et al. | 239/127.3 |
| 5,435,127 A | * | 7/1995 | Luffy et al. | 60/204 |

(Continued)

FOREIGN PATENT DOCUMENTS

| | | |
|---|---|---|
| EP | 1 219 777 A2 | 7/2002 |
| EP | 1 522 680 A1 | 4/2005 |

(Continued)

OTHER PUBLICATIONS

U.S. Appl. No. 12/490,962, filed Jun. 24, 2009, Blanchard, et al.

(Continued)

*Primary Examiner* — William H Rodriguez
(74) *Attorney, Agent, or Firm* — Oblon, Spivak, McClelland, Maier & Neustadt, L.L.P.

(57) ABSTRACT

Air bleed device for cooling components in a turbine engine, including an annular conduit (18) having a radially internal portion swept by an airflow (22) and which comprises at least one air inlet orifice (20) formed in an upstream radial wall (38) of the conduit (18), a flap valve (40) for controlling the airflow entering through the orifice (20) and of which the flapper (41) includes a plate (42) applied against the wall (38) and capable of being moved by sliding on said wall (38) by a maneuvering member (50) mobile in translation parallel to the wall (38) between a position in which the plate (42) closes off the orifice (20) and a position in which the plate (42) opens said orifice.

17 Claims, 2 Drawing Sheets

U.S. PATENT DOCUMENTS

| | | | | |
|---|---|---|---|---|
| 5,775,589 A * | 7/1998 | Vdoviak et al. | ............ | 239/127.1 |
| 5,996,936 A * | 12/1999 | Mueller | ........................ | 244/53 R |
| 6,021,637 A * | 2/2000 | Scavo | ............................. | 60/262 |
| 6,089,537 A * | 7/2000 | Olmsted | ................... | 251/129.11 |
| 6,301,877 B1 * | 10/2001 | Liang et al. | ................... | 60/226.1 |
| 6,409,149 B1 * | 6/2002 | Maher, Jr. | ..................... | 251/328 |
| 6,776,394 B2 * | 8/2004 | Lucas | .......................... | 251/259 |
| 7,032,835 B2 * | 4/2006 | Murphy et al. | ............... | 239/128 |
| 7,204,472 B2 * | 4/2007 | Jones et al. | .............. | 251/129.06 |
| 7,213,393 B2 * | 5/2007 | Lapergue et al. | ................ | 60/266 |
| 7,296,397 B2 * | 11/2007 | Curtelin et al. | ................. | 60/232 |
| 7,762,526 B2 * | 7/2010 | Coleman et al. | ............. | 251/187 |
| 7,854,124 B2 * | 12/2010 | Sadil et al. | ...................... | 60/771 |
| 8,141,366 B2 * | 3/2012 | Zamora et al. | .................. | 60/770 |
| 8,210,498 B2 * | 7/2012 | Blanchard et al. | ............ | 251/300 |
| 2005/0091964 A1 * | 5/2005 | Curtelin et al. | ................. | 60/262 |
| 2006/0049374 A1 | 3/2006 | Ehrne et al. | | |
| 2008/0029728 A1 | 2/2008 | Hunter et al. | | |

FOREIGN PATENT DOCUMENTS

| | | |
|---|---|---|
| EP | 1 849 986 A1 | 10/2007 |
| JP | 2003-172462 | 6/2003 |

OTHER PUBLICATIONS

U.S. Appl. No. 12/603,943, filed Oct. 22, 2009, Blanchard, et al.

* cited by examiner

COOLING AIR BLEED DEVICE IN A TURBINE ENGINE

This invention relates to a cooling air bleed device in a turbine engine, such as an airplane turbojet, in particular for cooling flaps of a convergent-divergent jet nozzle.

The jet nozzle of a turbojet generally comprises mobile flaps that are subjected to strong thermal stresses due to the passage of very hot gases coming from the turbine engine combustion chamber. These thermal stresses generate large amounts of infrared radiation capable of hindering the stealth of military aircraft and that should be minimized.

A solution consists of bleeding cold air in a secondary flow of the turbine engine, so as to direct it toward the flaps of the nozzle and cool them.

The patent application EP 1 522 680 of the applicant describes a system for ventilating mobile flaps of a convergent-divergent nozzle of an airplane turbojet, which system includes an annular conduit supplied with cooling air through orifices provided in a wall separating the interior of the conduit from the downstream end of an annular passage surrounding a post-combustion chamber of the turbojet and in which a cooling airflow circulates. This ventilation system also includes air distribution cells distributed around the conduit and connected thereto, and telescopic channels each connecting a cell to a divergent nozzle seal located in the same plane of symmetry as the cell.

The disadvantage of this system is that it does not enable the bled airflow to be modulated.

This air bleed adversely affects the performance of the turbojet and is generally unnecessary in all phases of the aircraft flight.

The invention is intended in particular to provide a simple, economical and effective solution to this problem, in particular enabling the airflow bled to be modulated at will in order to cool the nozzle.

It relates in particular to means for supplying cooling air in a turbine engine, located at a short distance upstream of the nozzle flaps, and which are capable of withstanding significant mechanical stresses generated by the thrust of gases in this location, and significant deformations of the nozzle due to high thermal stresses.

The invention also relates to means for supplying cooling air that are low profile and relatively lightweight, and that enable disturbances in the airflows flowing into the turbine engine to be limited, so as to optimize the performance of the turbine engine.

It also relates to cooling air supply means that are manually controlled by the airplane pilot.

The invention thus proposes a cooling air bleed device for cooling components in a turbine engine, including an annular conduit formed in a housing and of which a radially internal portion is swept by an airflow and comprises at least one air inlet orifice, which device includes a flap valve for controlling the airflow entering through the orifice, and wherein the orifice is formed in an upstream radial wall of the conduit and the flap valve includes a plate applied against said wall and capable of being moved by sliding on said wall by a maneuvering member mobile in translation parallel to the wall between a position in which the plate covers and closes off the orifice and a position in which the plate is moved away from the orifice and opens said orifice.

The air inlet orifice is formed in a surface substantially perpendicular to the direction of the airflow, thereby enabling the movement of this flow to be facilitated and the disturbances and head losses to be limited, and thus the performance of the turbine engine to be optimized.

The flap valve capable of being moved by sliding on the upstream radial face of the annular conduit has the advantage of being particularly compact and enables maximization of the space available for the cooling air bleed conduit.

In the closing position, the plate of the flap valve is pushed against the edge of the orifice and closes the latter tightly under the pressure of the airflow.

According to another feature of the invention, the wall comprises at least one rail for guiding the plate of the flap valve in translation.

The plate is advantageously attached at its radially external end to the maneuvering member.

This enables means for attaching the plate to the maneuvering member to be arranged in an area of the plate that is offset with respect to the orifice, when the plate closes said orifice.

The downstream face of the plate is preferably covered by a seal, which seal preferably has a stainless steel sheet structure inserted between graphite layers or a metal screen graphite structure, in order to tightly close the air inlet orifice.

The seal is advantageously attached to the plate by its edges, and the plate includes orifices opening onto the seal, enabling air pressure to be applied on the seal.

The orifices of the plate enable the pressure of the airflow moving from upstream to downstream to be used to advantage in order to apply the seal of the plate against the edge of the air inlet orifice and thus improve the tightness of the closure of said orifice.

The radially internal and external edges of the plate preferably have a curvature substantially equal to the curvature of the annular conduit.

This design of the plate enables it to entirely cover the air inlet orifice even though the latter is formed in the vicinity of the radially internal end of the radial wall of the annular conduit.

According to another feature of the invention, the valve includes a toothed wheel for rotating a threaded rod screwed into an internal threaded channel of the maneuvering member and held securely in translation by the housing.

The threaded rod cooperates with the internal threading of the maneuvering member in order to drive the latter in translation by a screw-nut effect.

The toothed wheel is rotated by controlled means, including for example a flexible cable maneuvered by a cylinder.

The valve advantageously includes a disengageable connecting ring that is mounted coaxially and superimposed on the toothed wheel and secured in rotation with the threaded rod, and that comprises teeth with oblique flanks intended to cooperate by meshing with teeth having a conjugated shape formed at one end of the toothed wheel opposite the teeth of the connecting ring, and the valve also preferably includes resilient return means axially pushing the teeth of the toothed wheel engaged with those of the connecting ring.

During opening or closing of the flap valve, when the plate abuts against a housing element limiting its course, the connecting ring enables the rotation of the toothed wheel to be decoupled from that of the threaded rod, and therefore from the translation of the plate maneuvering member, so that the toothed wheel can optionally continue its rotation without risk of damaging the flap valve and its maneuvering member.

According to another feature of the invention, the air bleed device is installed on the housing of the turbine engine in order to cool control flaps of a jet nozzle, and it preferably includes a series of flap valves that are distributed uniformly around the axis of the turbine engine and a control actuator connected to the flap valves by synchronous drive means, such as, for example, a flexible cable or a ball cable, connected in series to the flap valves.

The flap valves of the air bleed device described above enable a simple movement of means for driving these valves to be converted into a movement of opening or closing each of the flap valves, thereby enabling control of the device by a single simple drive means, which can moreover advantageously be chosen to be flexible, such as a ball cable, so that this device withstands deformations of the housing on which it is mounted and any mechanical stresses generated by the pressure of surrounding gases. The valves of the air bleed device according to the invention are capable of being used under these conditions, in particular temperature, which prohibit the use of electrical control valves, as is for example the case in the vicinity of a turbojet nozzle. These valves also have the advantage of having a low profile, and thus enabling the aerodynamic impact of the air bleed device on the flow of gases in the vicinity of the device to be limited. These valves are moreover uniformly distributed around the housing so as to enable uniform air bleed all around said housing.

The invention also relates to a turbine engine equipped with an air bleed device of the type described above.

The invention will be easier to understand, and other details, advantages and features thereof will become clearer in view of the following description, provided by way of a non-limiting example, in reference to the appended drawings, in which.

Figure 1:
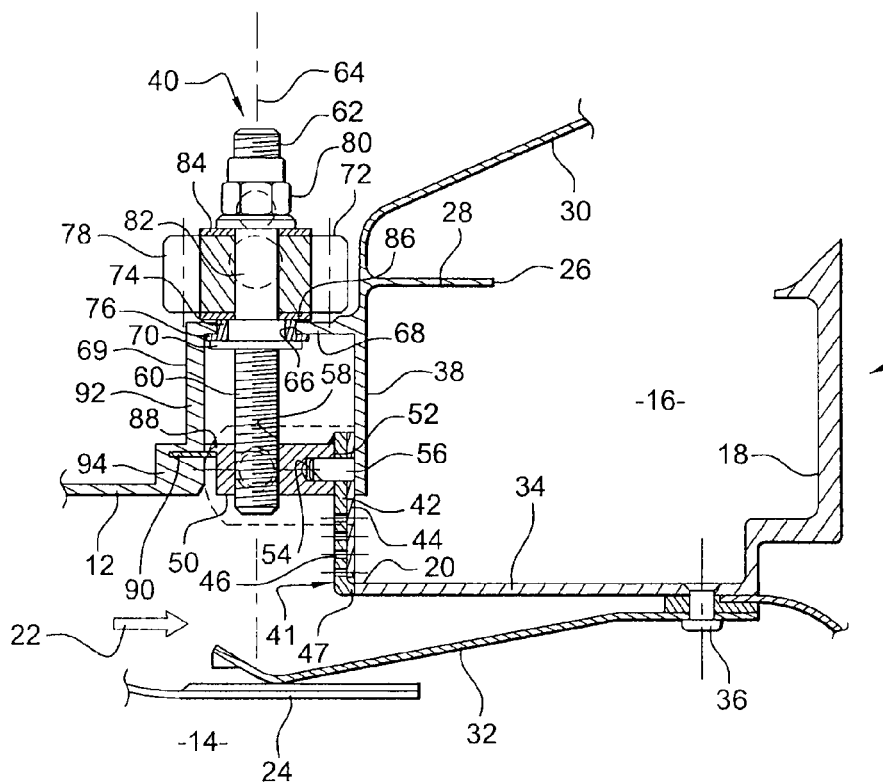
FIG. 1 is a partial diagrammatic view of an axial cross-section of an air bleed device according to a first embodiment of the invention, in which the device is mounted on a turbojet nozzle.

Reference is first made to FIG. 1, which shows a cooling air bleed device 10 mounted on the housing 12 of the afterbody of an airplane bypass turbojet comprising a post-combustion chamber 14, upstream of controlled flaps and nozzle seals of a jet nozzle, equivalent to the device described in document EP 1 522 680 cited above.

The device 10 includes an air circulation chamber 16 defined by a conduit 18 having a general annular shape and a rectangular axial cross-section, formed on the external surface of the housing. This conduit 18 includes orifices 20 intended for bleeding cooling air onto a secondary cool airflow 22 moving from upstream to downstream around an annular wall 24 defining the post-combustion chamber, in which the conduit 18 also includes other orifices 26 formed in its radially external wall 28 and connected to means 30 for routing and diffusing the air over the nozzle flaps to be cooled, in which said means 30 can, for example, be of the type described in the aforementioned prior art document.

An annular wall 32 extends between the downstream end of the external wall 24 of the post-combustion chamber 14 and the radially internal wall 34 of the conduit 18. This wall 32 is attached by rivets 36 to the downstream end of the radially internal wall 34 of the conduit, and is intended to divide the secondary cool air flow 22 into a radially external flow intended to supply the bleed device 10 in order to cool divergent flaps of the nozzle, and a radially internal flow intended to cool convergent flaps of said nozzle, as already described in the aforementioned prior art.

According to the invention, the air inlet orifices 20 in the conduit 18 are formed at the radially internal end of the upstream radial wall 38 of the conduit 18. Thus, the air bleed section of each orifice 20 is substantially perpendicular to the direction of the airflow 24, thereby enabling the bleed to be optimized while minimizing the disturbances and head losses of said airflow.

To enable control of the cooling airflow bled, each air inlet orifice 20 is closed off by a flap valve, like the valve 40 shown in FIG. 1.

Figure 2:
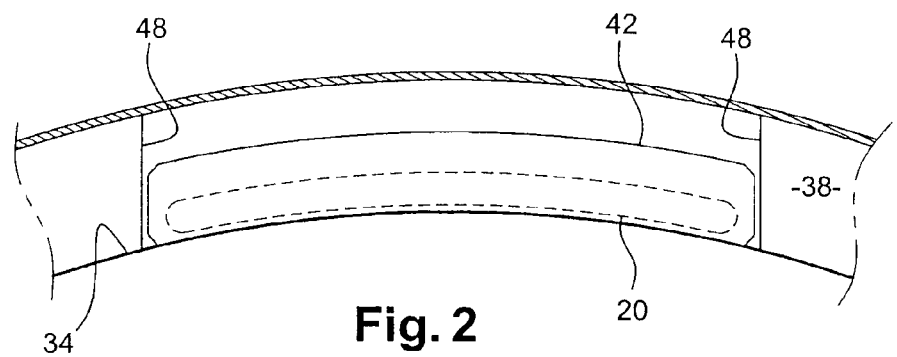
FIG. 2 is a partial diagrammatic frontal view from upstream of the upstream radial wall of the annular conduit of the air bleed device of FIG. 1.

The edges of the orifice 20 have a curvature substantially identical to that of the annular conduit 18, as shown in FIG. 2, on which said orifice 20 is diagrammatically shown with an interrupted line.

The flapper 41 of the valve 40 is formed by a flat metal plate 42 intended to be moved in translation according to a radial axis by sliding on the upstream radial wall 38 of the conduit. The plate 42 has a shape similar to that of the orifice 20, but its dimensions are greater than those of the orifice 20 so that the plate 42 can entirely cover the orifice 20 so as to close off the latter, as shown in FIGS. 1 and 2. In particular, the radially internal and external edges of the plate 42 have a curvature similar to that of the annular conduit 18.

The downstream face of the plate 42 is covered by a seal 44, made for example of a stainless steel sheet inserted between two graphite sheets, according to a structure sometimes called "Papiex". The seal can also be graphite with a metal screen.

The seal 44 is attached at its periphery to the plate 42, and it comprises air passage orifices 46 opening onto the seal 44 enabling air pressure 24 flowing from upstream to downstream to be applied against the seal 44 and thus the tightness of the closure of the orifice 20 to be optimized. For this, the orifices 46 are formed in a radially internal portion of the plate 42, with this portion being located opposite the orifice 20 in the closure position of the flapper 41. The plate 42 comprises, at its radially internal end, a springback 47 facing downstream and with a thickness substantially equal to the thickness of the seal 44, so as to enable better holding of the latter.

As shown in FIG. 2, the plate 42 is engaged between two radial rails 48 formed on the upstream radial wall 38 of the conduit in order to guide the plate 42 in translation.

The valve 40 includes a member 50 for maneuvering the plate 42 of the flapper in order to open and close the orifice 20. This maneuvering member 50 has, for example, a general parallelepiped shape and comprises a face 52 that is applied on the upstream face of the plate 42 and that comprises a cavity 54 in which a dowel pin 56 is engaged, attached to the plate 42 of the flapper. This dowel pin 56 extends in a direction substantially perpendicular to the plate 42 and it is attached to a radially external portion of the plate 42 not comprising air passage orifices 46.

The maneuvering member 50 also comprises a cylindrical channel 58 with a threaded internal surface, in which the threaded end 60 of a rod 62 with a radial axis 64 is screwed, rotationally mounted in an orifice 66 of a support disk 68 connected to the conduit 18 and forming the lid of a radial vent 69 formed on the housing 12.

The rod 62 passes through the orifice 66 and it comprises an annular collar 70 and a toothed drive wheel 72, which are applied against the edge of the orifice 66 of the support disk 68, on either side of said disk, and prevent the rod 62 from moving according to its axis 64, with respect to the support disk 68.

To facilitate the guiding of the rod 62 in rotation, a cylindrical sleeve 74 is mounted around the rod 62 so as to be interposed between the rod and the edge of the orifice 66. The sleeve 74 comprises an annular collar 76 interposed between the collar 70 of the rod 62 and the edge of the orifice 66.

The dowel pin 56 not only enables the maneuvering member 50 to drive the plate 42 of the flapper when it moves radially in translation, but it also enables any rotation of the maneuvering member around the axis 64 of the rod 62 to be prevented, due to the flat support of the plate 42 on the upstream radial wall 38 of the conduit.

The toothed wheel 72 has radial teeth 78 intended to engage with suitable drive means, an example of which will be described in greater detail below, and it is held on the rod 62 by a nut 80 screwed at the end of the thereof.

The toothed wheel 72 is borne by a non-threaded portion 82 of the rod 62 and it includes splines (not visible in the figures) extending radially over the internal face thereof and cooperating with splines (also not visible) with a substantially conjugated shape formed on the non-threaded portion 82 of the rod 62 in order to transmit the rotation movement of the toothed wheel 72 to said rod.

To minimize wear on the faces of the toothed wheel 72, the rod 62 advantageously has two washers 84 and 86 arranged on either side of said toothed wheel 72.

The maneuvering member 50 comprises a shoulder 88 formed at the radially external end of its upstream face and intended to abut against a stop member 90 secured to the housing when the flapper 41 entirely closes off the orifice 20, as in FIG. 1, so as to limit the course of the flapper 41 in the direction of closing the valve 40. The stop member is, for example, formed by the downstream end of a removable dowel pin 90 housed in an axial cavity formed in the wall 92 of the radial vent 69, with the cavity being formed in a protrusion 94 of the wall 92. The use of a removable dowel pin 90 as a stop member enables easy assembly of the maneuvering member 50 of the valve, in the absence of a dowel pin 90, which can then be easily mounted in its cavity when the flapper 41 and its maneuvering member 50 are in the opening position.

The device according to the invention works as follows: with the valve 40 initially in its closure position shown in FIG. 1, it is simply necessary, in order to cause the opening of the orifice 20 and the entrance of cool air into the conduit 18, to rotate the toothed wheel 72 in the direction of screwing of the threaded portion 60 of the rod 62 in the internal channel 58 of the maneuvering member 50, owing to suitable drive means.

In consideration of the locking in rotation of the drive member 50 by the dowel pin 56 of the plate 42, which plate is itself held against the upstream radial wall 38 of the conduit 18, and due to the locking in translation of the rod 62, the rotation of the rod 62 in the direction of screwing of its threaded portion 60 causes a translation of the maneuvering member 50 toward the exterior of the turbojet. The maneuvering member 50 drives the dowel pin 56 with it and thus causes the plate 42 to slide radially toward the exterior on the upstream radial wall 38 of the conduit 18, until the radially external end of the plate 42 abuts against the support disk 68.

In the open position, the air is bled onto the secondary flow 22 with almost no head losses, due to the fact that the bleed section is substantially perpendicular to the direction of movement of the secondary flow.

The closing of the orifice 20 by the flapper 41 is performed by rotating the toothed wheel 72 in the direction of unscrewing of the threaded portion 60 of the rod 62 outside of the internal channel 58 of the maneuvering member 50, so as to cause a translation of this member, and therefore of the plate 42 of the flapper, radially toward the interior of the turbojet, until the shoulder 88 of the maneuvering member 50 abuts against the dowel pin 90.

To prevent the plate 42 from being subjected to excessive mechanical stresses when its radially external end abuts against the support disk 68, it is preferable for the maneuvering member 50 to have a radial range such that, when the valve is in the open position, the radially external face of this member 50 abuts against the collar 70 and the rod 62.

Figure 3:
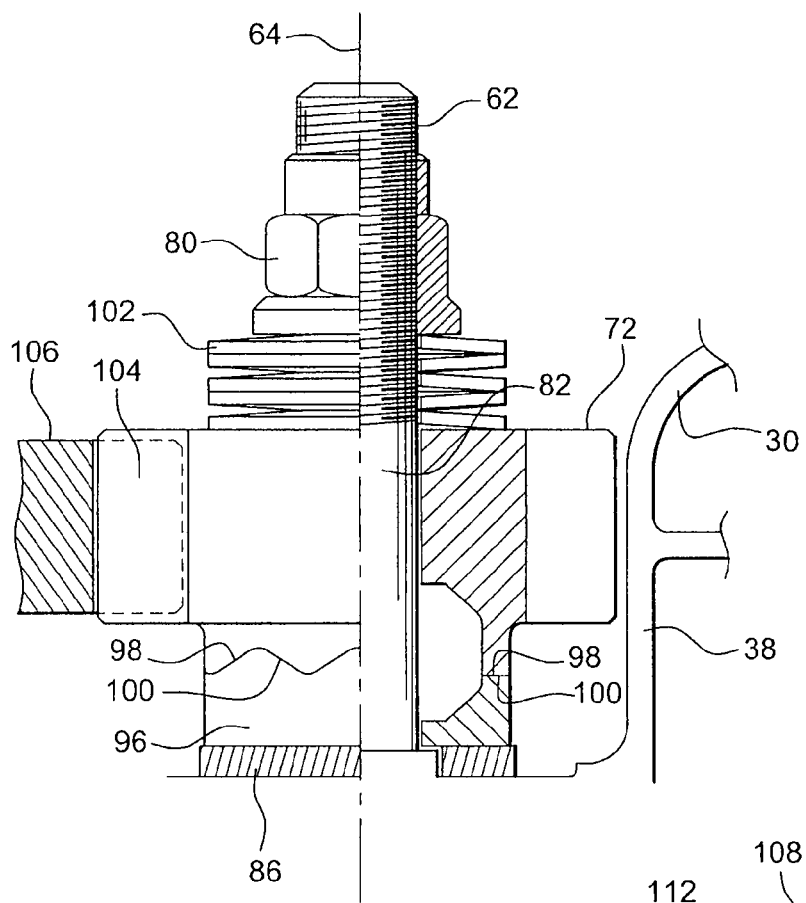
FIG. 3 is a partial diagrammatic view on a larger scale of rotational drive means in an air bleed device according to a second embodiment of the invention; the left-hand portion of this figure is a frontal view while the right-hand portion is a cross-section view according to an axial median plane of the rotational drive means.

The valve 40 can include a disengageable connecting ring 96 as shown in FIG. 3, in which the ring is coaxial to and superimposed on the toothed wheel 72, and comprises teeth 98 with oblique flanks intended to cooperate by meshing with teeth 100 having a conjugated shape formed at one end of the toothed wheel 72 opposite the teeth 98 of the connecting ring 96. In this case, it is not the toothed wheel 72 that is secured in rotation to the rod 62 owing to splines as in the case described above, but the connecting ring 96 that comprises splines (not visible in FIG. 3) extending radially over its internal face and cooperating with splines (also not visible) with a substantially conjugated shape formed on the non-threaded portion 82 of the rod 62 in order to drive the latter in rotation. Alternatively, the connecting ring 96 can be welded to the rod 62.

To enable the disengageable connecting ring 96 to work, as will be explained in greater detail below, resiliently deformable washers 102, such as wave or frustoconical washers, for example numbering three, are interposed between the toothed wheel 72 and its retaining nut 80 on the rod 62. FIG. 3 also shows a tooth 104 of a member 106 for rotating the toothed rod 72, which tooth 104 is intended to cooperate by meshing with the teeth 78 of the toothed wheel 72.

In operation, when the flapper 42 is maneuvered by a rotation of the toothed wheel 72, the disengageable connecting ring 96 transmits the rotation movement of the toothed wheel 72 to the rod 62 of which the threaded end 60 is screwed into the internal channel 58 of the maneuvering member 50.

When the flapper 41 reaches its closing position in which the shoulder 88 of the maneuvering member 50 abuts against the dowel pin 90, or when the flapper 41 reaches its opening position in which the radially external end of its plate 42 abuts against the support disk 68, the connecting ring 96 enables the rotation of the toothed wheel 72 to be decoupled from that of the rod 62, if the toothed wheel 72 continues to be rotated. Indeed, when the maneuvering member 50 is locked in translation, it prevents the rotation of the rod 62 and therefore of the connecting ring 96, which is secured in rotation to said rod 62. The force exerted by the rotational drive means of the toothed wheel 72 is then converted into an axial force oriented radially outwardly by the teeth with oblique flanks 98 and 100 of the connecting ring and the toothed wheel, with this force tending to move the toothed wheel 72 away from the connecting rod 96 while causing a compression of the resiliently deformable washers 102.

The disengageable connecting ring 96 enables the risks of damage of the air bleed device 10 to be minimized if the toothed wheel 72 is driven beyond the limits of the course of the flapper 42 or the maneuvering member 50, and thus prevents the need for sophisticated control means for controlling the drive means 106 of the toothed wheel 72.

Figure 4:
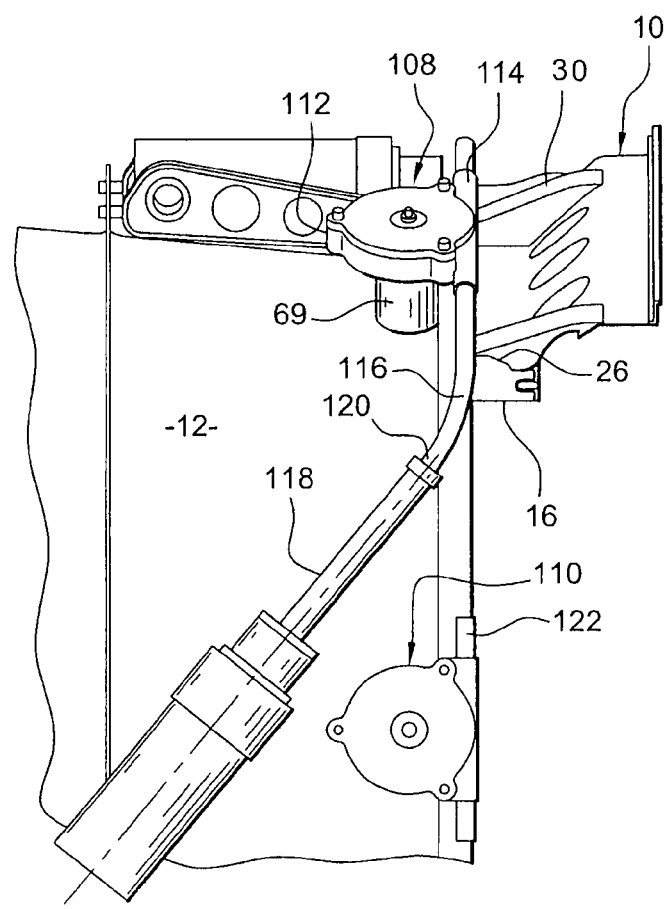
FIG. 4 is a partial diagrammatic cross-section in perspective of the jet nozzle equipped with the air bleed device of FIG. 1.

FIG. 4 shows an overview of the cooling air bleed device 10 described above, and more specifically shows two valves 108 and 110 of this device and means for controlling these valves. The toothed wheel of each valve of the device is protected by a cylindrical fairing 112 comprising a rectilinear hole 114 for the passage of a drive member, such as a flexible cable or a ball cable 116 in order to drive the toothed wheel. The cable 116 is actuated by a cylinder 118 mounted on the housing 12 of the nozzle and connected to an end 120 of the cable, with the other end 122 of said cable 116 being free at the outlet of the last valve 110 controlled by said cable.

The air bleed device 10 according to the invention provides the possibility of controlling all of the valves distributed around the nozzle in a synchronized manner by means of a single control cylinder, in order to cool the controlled turbojet nozzle flaps, in which the control of this device can be performed manually by the airplane pilot.

The use of a flexible cable 116 in order to transmit the control movement of the cylinder 118 to the toothed wheels 72 of the valves enables the system to withstand deformations of the housing 12 on which it is mounted while resisting the mechanical and thermal stresses generated by the flow of gases around said system.

In addition, such a cable 116 does not have to be in a closed circuit, and its end opposite the control cylinder 118 can remain free as already mentioned, thereby allowing for an advantageous weight gain.

The invention claimed is:

1. A turbine engine cooling air bleed device for cooling components in a turbine engine, comprising:
    an annular conduit formed in a housing that has a radially internal portion swept by an airflow, the annular conduit including at least one air inlet orifice; and
    a flap valve that controls air entering through the orifice,
    wherein the orifice is formed in an upstream radial wall of the conduit, and
    wherein the flap valve includes a plate applied against said upstream radial wall, the plate being slidably movable on said upstream radial wall via a maneuvering member that is mobile in translation parallel to the upstream radial wall between a first position in which the plate covers and closes off the orifice and a second position in which the plate is moved away from the orifice such that said orifice is open.

2. The turbine engine cooling air bleed device according to claim 1, wherein the upstream radial wall comprises at least one rail for guiding the plate of the flap valve in translation.

3. The turbine engine cooling air bleed device according to claim 1, wherein a radially external end of the plate is attached to the maneuvering member.

4. The turbine engine cooling air bleed device according to claim 1, wherein a downstream face of the plate is covered by a seal.

5. The turbine engine cooling air bleed device according to claim 4, wherein the seal includes a stainless steel sheet structure inserted between graphite layers or a graphite metal screen structure.

6. The turbine engine cooling air bleed device according to claim 4, wherein the seal is attached to the plate by edges of the seal, and wherein the plate includes air passage orifices opening onto the seal, enabling air pressure to be applied on the seal.

7. The turbine engine cooling air bleed device according to claim 1, wherein radially internal and external edges of the plate have a curvature substantially equal to a curvature of the annular conduit.

8. The turbine engine cooling air bleed device according to claim 1, wherein the flap valve further includes a toothed wheel that rotates a threaded rod in an internal threaded channel of the maneuvering member, the threaded rod being held securely in translation by the housing.

9. The turbine engine cooling air bleed device according to claim 8, wherein the flap valve further includes a disengageable connecting ring that is mounted coaxially and superimposed on the toothed wheel and is secured in rotation with the threaded rod, the connecting ring including teeth with oblique flanks that cooperate by meshing with teeth of the toothed wheel, the teeth of the toothed wheel having a conjugated shape formed at one end of the toothed wheel opposite the teeth of the connecting ring.

10. The turbine engine cooling air bleed device according to claim 9, wherein the flap valve includes resilient return means axially pushing the teeth of the toothed wheel engaged with the teeth of the connecting ring.

11. A turbine engine, comprising:
    a housing; and
    the turbine engine cooling air bleed device according to claim 1, said device being installed on the housing of the turbine engine in order to cool controlled flaps of a jet nozzle.

12. The turbine engine according to claim 11, wherein the air bleed device includes a series of said flap valves that are distributed uniformly around an axis of the turbine engine.

13. The turbine engine according to claim 12, further comprising a control actuator connected to the flap valves by synchronous drive means, the drive means including one of a flexible cable and a ball cable, connected in series to the flap valves.

14. A turbine engine, comprising the turbine engine cooling air bleed device according to claim 1.

15. The turbine engine cooling air bleed device according to claim 1, wherein the upstream radial wall is perpendicular to a central axis of the turbine engine.

16. The turbine engine cooling air bleed device according to claim 1, wherein the upstream radial wall is perpendicular to an incoming secondary cooling airflow direction.

17. The turbine engine cooling air bleed device according to claim 8, wherein the upstream radial wall is parallel to a radial axis of the threaded rod.

* * * * *